UNITED STATES PATENT OFFICE.

CLARENCE A. AXLINE, OF FULTONHAM, OHIO.

PRESERVING FRUIT-JUICES.

SPECIFICATION forming part of Letters Patent No. 244,517, dated July 19, 1881.

Application filed May 26, 1881. (No specimens.)

*To all whom it may concern:*

Be it known that I, CLARENCE A. AXLINE, of Fultonham, in the county of Muskingum and State of Ohio, have invented certain new and useful Improvements in the Method of Preservation of Fruit-Juices; and I do hereby declare the following to be a full, clear, and exact description of the invention, such as will enable others skilled in the art to which it pertains to make and use it.

My invention relates to an improvement in preservation of fruit-juices; and it consists in boiling the juice of the grapes, skimming off the scum, filtering while hot through a compound of charcoal, crushed mustard-seed, and ground sassafras-root, then boiling it again, and then adding sulphite of lime, as will be more fully described hereinafter.

The juice of the grapes is taken before fermentation takes place and boiled. All scum is carefully skimmed off, and then the liquid, while still hot, is filtered through a compound of partially-pulverized charcoal, crushed mustard-seed, and ground sassafras-root. The filter should be covered with fine woven wire, outside of which is fastened a flannel cloth to catch all escaping sediment. To each gallon of wine to be filtered there is placed in the filter two ounces of charcoal, two scruples of crushed mustard-seed, and six drams of ground sassafras-root. After the wine has been filtered it is again boiled, and if any scum or impurities appear on the surface they are removed, and then to every four gallons of juice there is added one ounce of sulphite of lime, when the wine will keep even in warm places for an indefinite length of time, even though it is not sealed up.

Wine treated in this way will keep unchanged for years, and will have a very pleasant sweet taste.

I am aware that the juice of various kinds of fruit has been boiled and then bottled for preservation, and this I disclaim.

This invention is an improvement upon the Patent granted to me April 26, 1881.

Having thus described my invention I claim—

The method above described for preservation of fruit-juices, consisting in boiling such juices before fermentation has taken place, skimming off the scum, filtering through a compound composed of charcoal, crushed mustard-seed, and ground sassafras-root, then boiling a second time, and then adding sulphite of lime, substantially as described.

In testimony whereof I affix my signature in presence of two witnesses.

CLARENCE A. AXLINE.

Witnesses:
ISAIAH GARDNER,
JAMES SLACK.